United States Patent

[11] 3,574,937

| [72] | Inventor | Merritt Wolfe |
| | | Akron, Ohio |
| [21] | Appl. No. | 764,146 |
| [22] | Filed | Oct. 1, 1968 |
| [45] | Patented | Apr. 13, 1971 |
| [73] | Assignee | The Goodyear Tire & Rubber Company |
| | | Akron, Ohio |

[54] KNIFE FOR CUTTING RUBBER AND THE LIKE
10 Claims, 10 Drawing Figs.

[52] U.S. Cl............................................. 30/123.3,
30/355
[51] Int. Cl....................................................... B26b 9/02
[50] Field of Search............................................ 30/123.3,
224, 355; 30/357

[56] References Cited
UNITED STATES PATENTS

| 42,644 | 5/1864 | Davis............................ | 30/355X |
| 542,583 | 7/1895 | Ball............................... | 30/355 |
| 913,207 | 2/1909 | Grah............................. | 30/355 |
| 1,975,219 | 10/1934 | Alexander..................... | 30/355X |
| 2,641,832 | 6/1953 | Champlin..................... | 30/355X |

FOREIGN PATENTS

| 437,076 | 10/1935 | Great Britain................ | 30/355 |

Primary Examiner—Lester M. Swingle
Assistant Examiner—J. C. Peters
Attorneys—F. W. Brunner and M. William Goodwin ABSTRACT: A knife for cutting rubber and the like having two generally smooth sides provided with grooves, and a generally straight sharp cutting edge provided with notches. In the use of the knife, lubricant which was previously supplied to the confronting surfaces of the knife and the rubber, and the notches engage and break, or remove, any filamentary material embedded in the rubber.

The foregoing abstract is not to be taken as limiting the invention of this application, and in order to understand the full nature and extent of the technical disclosure of this application, reference must be made to the accompanying drawing and the following detailed description.

Patented April 13, 1971
3,574,937
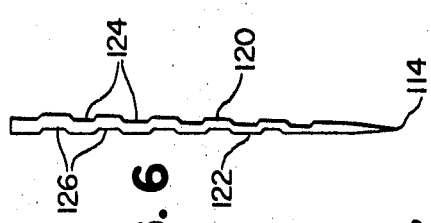
FIG. 2
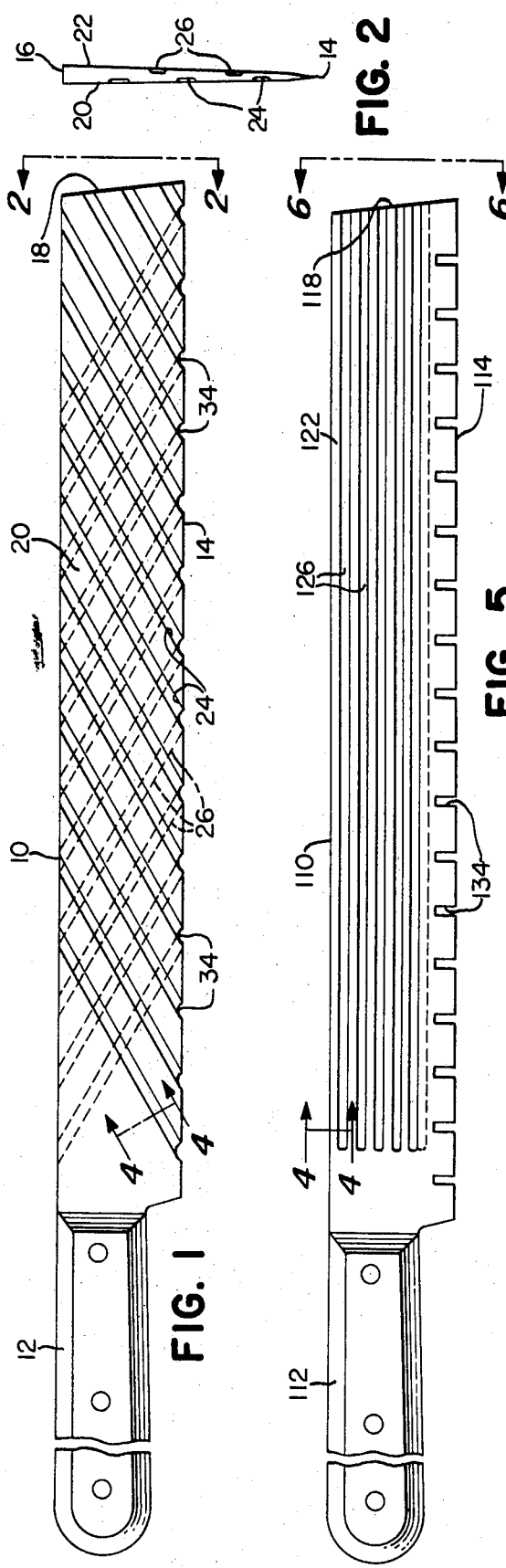
FIG. 1 FIG. 5
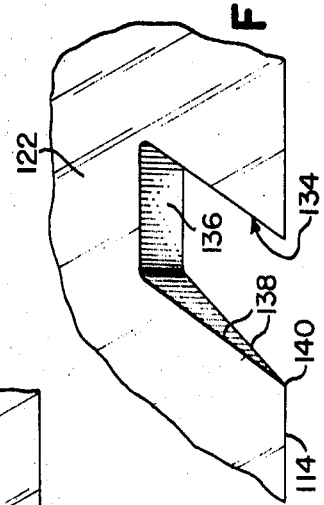
FIG. 6
FIG. 7
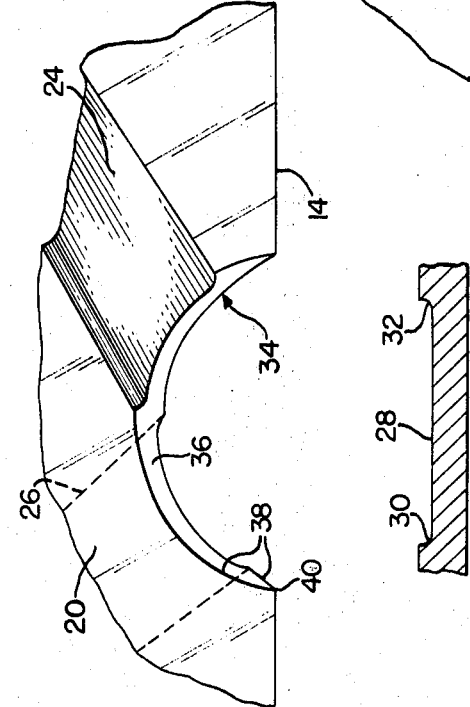
FIG. 3
FIG. 4
INVENTOR.
MERRITT W. WOLFE
BY R. W. Brunner
ATTORNEY

KNIFE FOR CUTTING RUBBER AND THE LIKE

This invention relates to the cutting of rubber and rubberlike material and is particularly useful in the cutting of these materials when they have been reinforced by short pieces of filamentary material.

The cutting of rubber, and particularly rubber that is reinforced by short pieces of filamentary material, poses some unique problems. The wedging action of the blade forces the rubber apart in the cut area resulting in forces between the confronting surfaces of the rubber and the sides of the blade. Since rubber has a high coefficient of friction, this force results in drag on the blade making it difficult to draw the knife back and forth. Also, if the rubber is reinforced with short pieces of filamentary material, such as wire or fiberglass, they will resist the cutting action of the blade.

An object of this invention is to provide a novel and improved knife for cutting rubber and in particular rubber that is reinforced with short pieces of filamentary material.

A further object of this invention is to provide a novel means of dispensing lubricant to the cut surface of the rubber and the sides of the knife in order to reduce the frictional drag on the knife.

Other objects will be in part obvious, and in part pointed out more in detail hereinafter.

In the drawings:

FIG. 1 is a side elevational view of a knife constructed in accordance with this invention;

FIG. 2 is an end view of the blade of the knife of FIG. 1 taken along line 2-2;

FIG. 3 is an enlarged perspective view of a typical notch in the knife of FIG. 1;

FIG. 4 is an enlarged sectional view taken substantially along the line 4-4 of FIG. 1 and FIG. 5;

FIG. 5 is a side elevational view of an alternate embodiment of a knife constructed in accordance with this invention;

FIG. 6 is an end view of the blade of the knife of FIG. 5 taken along line 5-5; and FIG. 7 is an enlarged, fragmentary perspective view of the blade of the knife of FIG. 5.

As shown in FIGS. 1, 2 and 3, a knife constructed in accordance with this invention comprises an elongated blade 10 with a handle 12 fixed on one end. The blade 10 generally is wedge-shaped in cross section and terminates in a generally straight sharp-cutting edge 14 at the narrow end of the wedge and a blunt edge 16 at the wide end of the wedge. Both sides 20,22 of the blade 10 are substantially flat and the end 18 of the blade 10 opposite the handle is generally straight. Each side of the blade is provided with a plurality of groove means 24 disposed diagonally of the blade and at an angle of 30° to the sharp edge 14. The groove means 24 on one side of the blade are generally parallel and spaced approximately three-eighths of an inch apart. The groove means 26 on the opposite side are also generally parallel and spaced approximately three-eighths of an inch apart, but are disposed at an angle of 120° from those on the front side of the blade or at an angle of 30° to the sharp edge 14. Each groove means 24,26 comprises a generally straight groove approximately ⅛ inch wide and one sixty-fourths inch deep extending substantially from the blunt edge 16 to the sharp edge 14 of the blade 10. The grooves are generally flat at the bottom 28 with rounded corners 30 at the sides 32.

A series of notches 34 are provided in the sharp-cutting edge 14 and in this particular embodiment, are located at the terminus of groove means 24,26. 26. Each notch 34 is formed by a surface 36 which is generally perpendicular or normal to the sides 20,22 of the blade 10. The bordering edges 38 of the notches, formed by the surface 36 and the sides 20,22 22 of the blade 10, are sharp. When viewed in the general plane of the blade 10, the notch 34 is curvilinear and more particularly, a segment of an arc of a circle. The surface 36, the sharp-cutting edge 14 and the sides 20,22 of the knife converge at a point to form a generally sharp corner 40.

In an alternate embodiment of the invention illustrated in FIGS. 5, 6 and 7, the groove means 124,126 are similar in shape to those in FIG. 4, but are disposed generally parallel to the sharp edge 114 and extend from the free end 118 of the blade substantially back to the handle 112. The grooves 124,126 are approximately ⅛ inch wide and one sixty-fourth inch deep and are spaced at least ⅛ inch apart. Each pair of grooves 124 on one side 120 of the blade 110 straddle a groove 126 on the other side of the blade 110. This alternate spacing of the grooves on opposite sides of the blade is done to avoid thin points in the blade that would occur at the base 28 of the grooves if they are disposed back to back. The sharp edge 114 of the blade 110 is provided with a series of polygonal notches 134 approximately ⅛ inch wide and five-sixteenths inch deep. Again, each notch is formed by surfaces 136 which are generally normal to the sides 120,122 of the blade 110. The bordering edges 138 of the notches 134 formed by the surfaces 136 and the sides 120,122 of the blade are sharp. Also, the flat surface 136, the sharp-cutting edge 114 and the sides 120,122 of the blade 110 converge to a point to form a generally sharp corner 140. The notches 114 are spaced approximately ¾ inch on centers providing approximately ⅝ inch of smooth, straight cutting edge 114 between each two notches.

In the use of the knife, the blade is dipped into water or any suitable liquid in order to get lubricant into the grooves 24,26 (124,126). The rubber or rubberlike material is then cut by drawing the knife blade back and forth in the usual manner across the piece being cut. As the sharp edge 14 (114) begins to pass down through the material being cut, the corners 40 (140) of the notches 34 (134) will engage or catch any short pieces of filamentary material embedded in the rubber, such as wire or fiberglass, and they will either break or draw out these pieces of filamentary material. As the blade continues to pass through the rubber, water or lubricant is dispensed from the grooves 24, 26 (124, 126) to the confronting surface of the rubber being cut and the sides of the blade 10 (110), thus lubricating these surfaces and reducing the frictional drag on the blade 10 (110).

It is necessary that there be a substantially straight, sharp-cutting edge 14 (114) as opposed to numerous sawteeth or points in the cutting edge which will tend to catch or hang up in the rubber being cut. It is also necessary that there be substantial flat surface on the sides 20, 22 (120, 122) of the blade 10 (110) as opposed to numerous closely spaced grooves or sharp teeth in the sides of the blade which also will tend to drag or catch on the rubber and increase the force required to draw the blade back and forth through the rubber.

While the grooves 24, 26 (124, 126) have been described as approximately ⅛ inch wide and one sixty-fourth inch deep, which is to be preferred, it is not necessary that these dimensions be strictly adhered to. It is necessary that the grooves 24, 26 (124, 126) be wide enough and deep enough to accept and retain lubricant and later, during the cutting action, to dispense this lubricant to the confronting surfaces of the blade 10 (110) and the material being cut. Depending on the general wedge-shaped construction of the blade, it may be necessary to reduce the depth of the groove 24, 26 (124, 126) as the grooves progress closer to the narrow edge 14 (114) of the wedge-shaped cross section in order to prevent excessive weakening of the blade 10 (110). It should further be noted that in the preferred embodiment of the invention illustrated in FIG. 1, the groove means 24, 26 terminate in a notch 34. It is not necessary that these groove means terminate in a notch 34 or even in the sharp-cutting edge 14. However, this does improve the conduction of lubricant close to the cutting edge 14, thus more effectively reducing the frictional drag on the blade 10. This advantage of a groove 24, 26 terminating in a notch is lost after the blade 10 is sharpened several times and the edge 14 is worn back. At this point the grooves on opposite sides of the blade will no longer intersect at the cutting edge 14.

The notches 34 (134) which have been described as generally curvilinear or polygonal when viewed in the general plane of the blade could be triangular, trapezoidal, rectangular or any other shape which ends in a generally sharp corner 40 (140) at the cutting edge 14 (114). It is merely necessary that the notch 34 (134) terminate at the sharp-cutting edge 14 (114) in somewhat of a corner 40 (140) which is capable of catching or engaging filamentary material.

In the particular embodiments illustrated and described, the grooves on each side of the blade are parallel and straight. It is not necessary that the grooves be either parallel or straight, but merely that they be sufficiently wide and deep in order to accept and retain lubricant and later dispense it to the confronting surface of the rubber being cut.

While certain representative embodiments and details have been shown for the purpose of illustrating the invention, it will be apparent to those skilled in the art that various changes and modifications may be made therein without departing from the invention.

I claim:

1. A knife for cutting rubber and the like comprising: a blade having two sides and a generally straight sharp-cutting edge; said cutting edge being provided with a plurality of notches, all of the sides of said notches being defined by surfaces which are generally normal to the general plane of the sides of said blade; and means providing a plurality of groove means on at least one of said sides for receiving and dispensing lubricant during use of the knife.

2. A knife as described in claim 1 wherein said groove means comprises a plurality of grooves extending parallel to the cutting edge of said blade.

3. A knife as described in claim 1 wherein said groove means comprises a plurality of grooves extending diagonally of said blade.

4. A knife as described in claim 2 wherein the bordering edges of said notches are polygonal as viewed in the general plane of the blade.

5. A knife as described in claim 2 wherein the bordering edges of said notches are curvilinear as viewed in the general plane of the blade.

6. A knife as described in claim 2 wherein said grooves are spaced at least ⅛ inch apart.

7. A knife as described in claim 3 wherein said grooves are spaced at least ⅜ of an inch apart.

8. A knife as described in claim 1 wherein said groove means comprise a plurality of grooves at least three thirty-seconds inch wide and one sixty-fourth of an inch deep.

9. A knife as described in claim 3 wherein the bordering edges of said notches are polygonal as viewed in the general plane of the blade.

10. A knife as described in claim 3 wherein the bordering edges of said notches are curvilinear as viewed in the general plane of the blade.